United States Patent [19]

Weise et al.

[11] Patent Number: 5,531,962

[45] Date of Patent: Jul. 2, 1996

[54] CADMIUM-FREE SILVER ALLOY BRAZING SOLDER, METHOD OF USING SAID SOLDER, AND METAL ARTICLES BRAZED WITH SAID SOLDER

[75] Inventors: Wolfgang Weise, Frankfurt am Main; Alexander Voelcker, Rodenbach; Dieter Kaufmann, Birstein; Willi Malikowski, Aschaffenburg; Joerg Beuers, Gelnhausen; Harald Krappitz, Hanau, all of Germany

[73] Assignee: Degussa Aktiengesellschaft, Frankfurt, Germany

[21] Appl. No.: 283,919

[22] Filed: Aug. 3, 1994

Related U.S. Application Data

[63] Continuation-in-part of Ser. No. 114,164, Sep. 1, 1993, abandoned.

[30] Foreign Application Priority Data

Sep. 2, 1992 [DE] Germany .......................... 42 29 189.5
May 7, 1993 [DE] Germany .......................... 43 15 189.2

[51] Int. Cl.$^6$ .............................. C22C 5/08; C22C 30/00
[52] U.S. Cl. .......................... 420/587; 420/504; 148/430; 148/442
[58] Field of Search ................... 420/504, 587; 148/430, 442; C22C 5/08, 30/00

[56] References Cited

FOREIGN PATENT DOCUMENTS 2275271 1/1976 France .
04-339590 11/1992 Japan .

*Primary Examiner*—David L. Lacey
*Assistant Examiner*—Sean Vincent
*Attorney, Agent, or Firm*—Beveridge, DeGrandi, Weilacher & Young

[57] ABSTRACT

Cadmium-free brazing solders with working temperatures under 630° C. containing 45 to 80 wt. % silver, 14 to 25 wt. % copper 10 to 25 wt. % gallium, 1 to 7 wt. % zinc and 0 to 5 wt. % indium and/or tin. The alloys have good cold workability and ductility.

5 Claims, No Drawings

CADMIUM-FREE SILVER ALLOY BRAZING SOLDER, METHOD OF USING SAID SOLDER, AND METAL ARTICLES BRAZED WITH SAID SOLDER

REFERENCE TO A RELATED APPLICATION

This is a continuation-in-part of our application Ser. No. 08/114,164 filed Sep. 1, 1993, now abandoned which is relied on and incorporated herein by reference.

BACKGROUND AND INTRODUCTION

The present invention relates to the use of cadmium-free silver alloys as brazing solders, in particular as general purpose brazing solders for use with fluxes in air.

Brazing solders are considered to be metal alloys suitable for brazing with working temperatures in excess of 450° C. They often consist of silver with added copper, zinc and cadmium. Currently, there practically no usable general purpose brazing solders for use with fluxes, or under a vacuum or protective gas, which have a working temperature below 600° C. However, the lower the working temperature, the less the mechanical properties of the workpieces to be joined are impaired during the brazing operation by heating to this temperature and energy requirements are simultaneously reduced. It is therefore important to have available brazing solders which have the lowest possible working temperature.

Brazing solders with working temperatures between 600° and 700° C. mainly consist of alloys of the metals silver, copper, tin, zinc and cadmium. It is, however, known that cadmium and its highly volatile oxides may have toxic effects if they are absorbed by the human body. Such absorption cannot always be completely eliminated when brazing is performed incorrectly with solders containing cadmium, so that there may be a risk of poisoning. This gives rise to the requirement to greatly reduce the cadmium content of brazing solders or to keep brazing solder alloys free of cadmium.

In most previously used brazing solder alloys with a working temperature between 600° and 700° C., a moderate or high cadmium content is necessary to achieve these low temperatures. Previously known cadmium-free brazing solders have working temperatures which are 80° to 120° C. higher than for solders containing cadmium, which is not tolerable for temperature sensitive materials. While brazing solder alloys of silver-copper-tin with high proportions of tin do have low working temperatures, they are, however, very brittle and cannot be made into shaped articles.

A cadmium-free brazing solder based on silver is known from DE-AS 24 17 060, which contains 40 to 50 wt. % silver, 15 to 38 wt. % copper, 22 to 32 wt. % zinc, 1 to 6 wt. % tin, and 0.5 to 3 wt. % indium. The working temperatures of these brazing solders are between 710° and 630° C., which is, however, still too high for various applications.

DE-OS 33 15 498 describes stratified contact pieces for low current contacts in which the solder layer consists of a silver-copper-gallium alloy. The alloy contains 60 to 75 wt. % silver, 18 to 35 wt. % copper, and 5 to 8 wt. % gallium, wherein the latter component may also be replaced with 4 to 7 wt. % gallium plus 1 to 4 wt. % indium or with 1 to 4 wt. % gallium and 3 to 7 wt. % tin. Melting points for these solders are not stated; they are, however, above 650° C.

Solders with 50 to 65 wt. % silver, 5 to 41 wt. % copper, 3 to 12 wt. % gallium, and 6 to 18 wt. % indium are known from Soviet patent SU 450 673 (Derwent Abstract 75-65066W7/39). Their melting point is from 640° to 680° C.

DE-OS 27 45 409 describes brazing solder alloys with 50 to 70 wt. % silver, 15 to 30 wt. % copper, 8 to 20 wt. % zinc, and 0.1 to 8 wt. % gallium and/or indium. Their melting point is between 650° and 680° C.

The melting points of these alloys may be still further reduced by raising the gallium content. However, silver-copper alloys with more than 8 wt. % gallium are difficult to work and can no longer be made into semi-finished articles.

SUMMARY OF THE INVENTION

An object of the present invention was therefore to provide cadmium-free brazing solder alloys based on silver which have the lowest possible working temperature below 630° C., which may be readily formed, and which may be used for general purpose applications. The alloys have good cold workability and ductility.

This object and others are achieved according to the present invention by the use of silver alloys with 45 to 80 wt. % silver, 14 to 25 wt. % copper, 10 to 25 wt. % gallium, 1 to 7 wt. % zinc, and 0 to 5 wt. % indium and/or tin.

Preferably, alloys made from 62 to 72 wt. % silver, 14 to 18 wt. % copper, 12 to 24 wt. % gallium, and 2 to 6 wt. % zinc are used. Alloys made from 65 to 70 wt. % silver, 15 to 18 wt. % copper, 15 to 22 wt. % gallium and 2 to 6 wt. % zinc have proved particularly successful. Indium and/or tin can be added to these alloys to further decrease the working temperature and to improve wetting characteristics.

In addition, another object is metal articles brazed with such solders and a method of using such solder compositions as a solder.

DETAILED DESCRIPTION OF THE INVENTION

Surprisingly, the alloys of the present invention have working temperatures between 580° and 620° C. They exhibit very good wetting on various metal substrates, such as copper, nickel, brass, iron-nickel alloys, or steel, both under protective gas and after use of fluxes in air. The alloys are surprisingly ductile and readily shapeable, so that the most varied shaped solder articles may be produced from them.

It was found that Zn lowers the melting point of AgCuGa alloys as shown in the table below:

| Ag | Cu | Ga (in wt. %) | Zn | Melting Range |
|---|---|---|---|---|
| 64 | 16 | 16 | 4 | 620°–625° C. |
| 62 | 16 | 15 | 7 | 608°–609° C. |

It has surprisingly been found that the processability of silver-copper-gallium alloys with more than 10 wt. % gallium can be substantially improved if zinc is added to the alloy in quantities of 1 to 7 wt. %; the copper content must, however, also be at least 14 wt. %. Unexpectedly, with zinc: contents of greater than 7 wt. %, processing properties deteriorate distinctly.

The following table contains, by way of example, the composition and working temperatures of several solder alloys according to the present invention:

TABLE

| Solder number | Alloy composition in wt. % | | | | | Working temp. (°C.) |
| --- | --- | --- | --- | --- | --- | --- |
| | Ag | Cu | Ga | Zn | Sn | |
| 1 | 68 | 14 | 12 | 6 | — | 590 |
| 2 | 58 | 20 | 15 | 7 | — | 620 |
| 3 | 62 | 16 | 15 | 7 | — | 610 |
| 4 | 64 | 16 | 16 | 4 | — | 610 |
| 5 | 65 | 16 | 15 | 3 | 1 | 600 |

Surprisingly, increasing the gallium content to <10 wt. % while lowering the zinc content to >7 wt. % decreases the melting point of the alloy while still allowing the alloy to have good ductility. This is shown in the following table:

| Solder number | Ag | Cu | Ga | Zn | Sn | Cold Workability* | Working Temperature |
| --- | --- | --- | --- | --- | --- | --- | --- |
| | | (in wt. 5) | | | | | |
| 6 | 62 | 16 | 15 | 7 | — | >20% | 610°C. |
| 7 | 60 | 16 | 7 | 17 | — | <5% | not measured |
| 8 | 55 | 16 | 15 | 14 | — | >5% | not measured |
| 9 | 62 | 20 | 3 | 15 | — | >20% | 690°C. |
| 10 | 56 | 22 | — | 17 | 5 | >20% | 650°C. |

*Cold workability was determined by rolling a plate of the alloy of a specific thickness (e.g., 2 mm) down to foils of a thickness of up to 0.200 mm or less. The cold workability in % gives the amount of deformation until no or little cracking at the edges of the plate occurs (i.e., it is the maximum deformation rate until the alloy must be annealed for recrystallization). The term "cold workability" is well known in the art and it is used herein in its art recognized definition.

Solder number 9 is taken from DE 2,745,409 and shows that low Ga contents and high Zn contents do not lead to working temperatures below 630° C. and do not result in good ductility (cold workability). In contrast, solder number 6 (an example of the present invention) has a working temperature below 630° C. and good ductility.

The solders of this invention are used in the same way as conventional solders. Conventional fluxes can be used. A wide variety of metal articles can be soldered or brazed in this way.

Further variations and modifications of the invention will become apparent to those skilled in the art from the foregoing and are intended to be encompassed by the claims appended hereto.

German Priority Applications P 42 29 189.5, filed on Sep. 2, 1992, and P 43 15 189.2, filed on May 7, 1993, are relied on and incorporated by reference.

What is claimed:

1. A cadmium-free silver alloy brazing solder consisting of 45 to 80 wt. % silver, 14 to 25 wt. % copper, 10 to 25 wt. % gallium, 1 to 7 wt. % zinc, and 0 to 5 wt. % indium and/or tin.

2. The solder according to claim 1 which has a working temperature below 630° C.

3. The solder according to claim 1 which has a cold workability of greater than 20%.

4. A cadmium-free silver alloy brazing solder consisting of 62 to 72 wt. % silver, 14 to 18 wt. % copper, 12 to 24 wt. % gallium, 0 to 5 wt. % indium and/or tin, and 2 to 6 wt. % zinc.

5. A cadmium-free silver alloy brazing solder consisting of 65 to 70 wt. % silver, 15 to 18 wt. % copper, 12 to 22 wt. % gallium, 0 to 5 wt. % indium and/or tin, and 2 to 6 wt. % zinc.

\* \* \* \* \*